United States Patent [19]

Beboux

[11] Patent Number: 4,823,548
[45] Date of Patent: Apr. 25, 1989

[54] INTERNAL ANTI-POPPING ASSEMBLY FOR SOLID PROPELLANT ROCKET MOTOR

[75] Inventor: Jean Beboux, Bordeaux, France

[73] Assignee: Societe Europeenne de Propulsion, Suresnes, France

[21] Appl. No.: 247,436

[22] Filed: Sep. 6, 1988

Related U.S. Application Data

[63] Continuation of Ser. No. 938,066, Dec. 4, 1986, abandoned.

[30] Foreign Application Priority Data

Dec. 5, 1985 [FR] France ................. 85 18021

[51] Int. Cl.⁴ .................................. F02K 9/00
[52] U.S. Cl. ........................... 60/253; 60/255
[58] Field of Search ............ 60/253, 255, 270.1, 60/251, 39.47

[56] References Cited

U.S. PATENT DOCUMENTS

| | | | |
|---|---|---|---|
| 2,957,309 | 10/1960 | Kobbeman | 60/255 |
| 3,362,159 | 1/1968 | Heesacker | 60/253 |
| 3,364,809 | 1/1968 | Hinderer | 60/255 |
| 3,446,018 | 5/1969 | Macbeth . | |
| 3,616,646 | 11/1971 | Mikeska . | |
| 3,786,633 | 1/1974 | Worcester et al. . | |
| 3,916,618 | 11/1975 | Araki et al. | 60/255 |
| 4,345,427 | 8/1982 | Whitesides, Jr. | 60/254 |
| 4,458,483 | 7/1984 | Vetter | 60/253 |

FOREIGN PATENT DOCUMENTS

| | | |
|---|---|---|
| 2248416 | 10/1974 | France . |
| 2466627 | 10/1979 | France . |
| 729525 | 5/1955 | United Kingdom . |

Primary Examiner—Louis J. Casaregola
Assistant Examiner—Timothy S. Thorpe
Attorney, Agent, or Firm—Lowe, Price, LeBlanc, Becker & Shur

[57] ABSTRACT

A solid grain block is housed in a casing with interposition of a heat protection layer and defines a combustion chamber, and a separation zone is formed between the solid grain and the heat protection layer of the rocket motor bottom structure by means of a skin detached from said layer and adhering to the solid grain, at least one of the two parts constituted by the detached skin and the heat-protection layer of the rocket motor bottom structure being provided with projections or teeth to ensure a minimum spacing of the detached skin with respect to said layer and to give easy access to the gases into the separation zone.

1 Claim, 3 Drawing Sheets

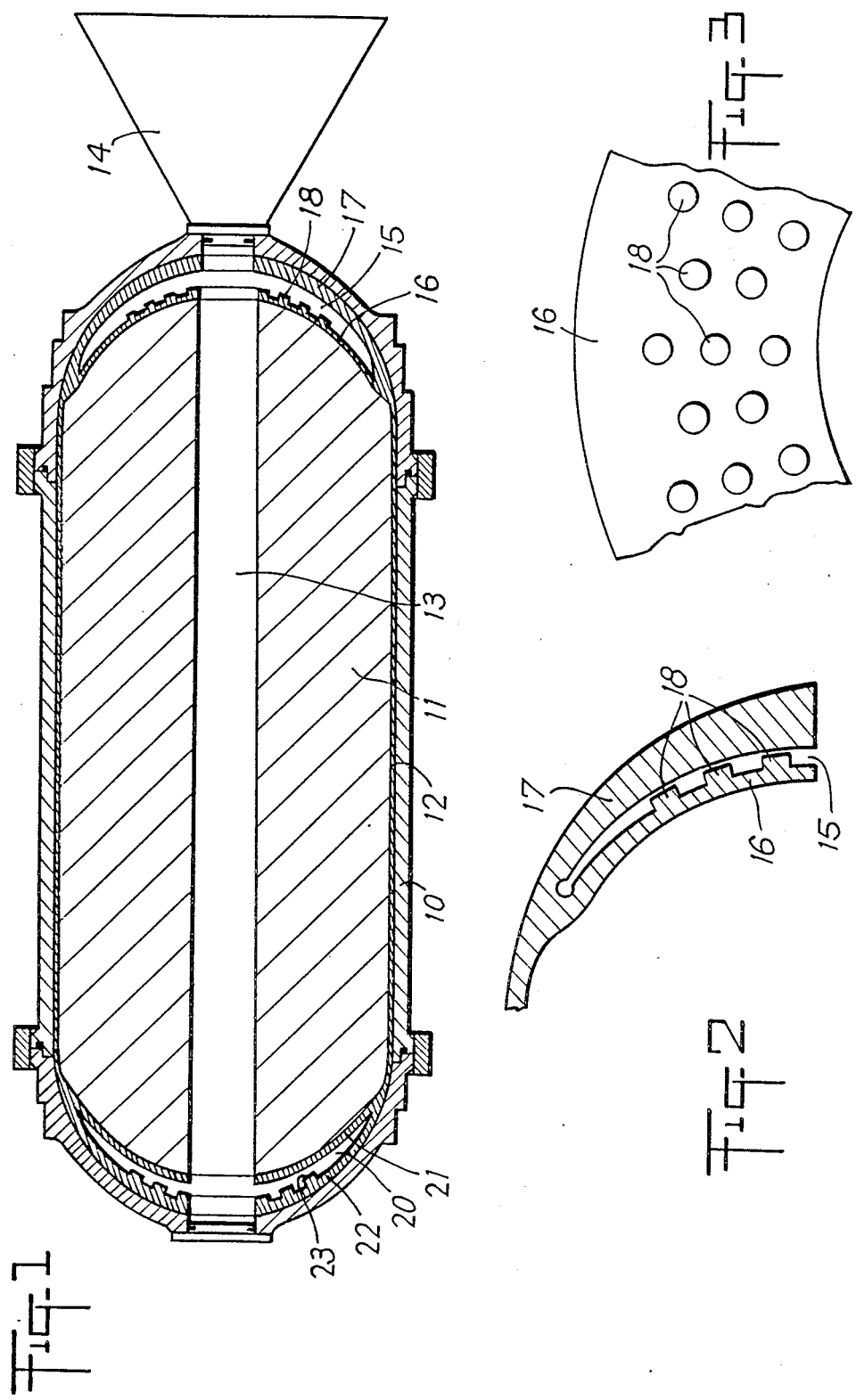

INTERNAL ANTI-POPPING ASSEMBLY FOR SOLID PROPELLANT ROCKET MOTOR

This is a continuation of application Ser. No. 938,066, filed Dec. 4, 1986, now abandoned.

The present invention relates to an internal anti-popping assembly for a solid propellant rocket motor of the type comprising a propellant grain block housed in a casing with a heat-protection layer interposed between the propellant grain and the casing, and defining a combustion chamber, a separation zone formed between the propellant grain and the heat-protection layer of a bottom structure of the rocket, by a skin detached from said heat-protection layer and adhering to the solid grain, and means providing a passage for gases from the combustion chamber into the separation zone.

A rocket motor of the type described hereinabove is described in French Pat. No. 2,466,627. The propellant grains are subjected to mechanical stresses and deformations, such as elongations, during the stages of production, storage and operation. Therefore it is well-known to provide separation zones between solid grain and adjacent rocket structure, in particular in bottom areas. The volume occupied by the separation zones varies with the position of the rocket motor, the state conditions, and with the stresses exerted on the rocket. It may even happen that one or more separation zones are closed after for example prolonged storage, an acceleration field, an internal pressure exerted on the bottom, unexpected adherence of the faces opposite the separation zone or the like In such a case, any sudden opening of the separation zone after igniting the rocket motor may cause a sudden variation of the stress exerted on the solid grain throughout the separation zone. The resulting shock, or "popping" may be very strong and may endanger the performance of the equipment driven by the rocket motor. In order to overcome said popping phenomenon, it has been proposed, in French Pat. No. 2 466 627 to form a passage connecting the combustion chamber with the separation zone by means of elements joined to the bottom structure of the rocket and to the solid grain, said elements being so arranged as to keep the section of the passage constant throughout the opening and closing movement of the separation zone.

However, all the solutions described in French Pat. No. 2 466 627 require a relatively complex rocket structure and it is the object of the present invention to propose means of helping the passage of the gases from the combustion chamber towards the separation zone, without complicating the structure of the rocket or its manufacture.

This object is reached with a rocket motor assembly of the type defined at the beginning of the present description, in which, according to the invention, the detached skin and/or the heat-protection layer of the rocket bottom structure are provided with the projections or teeth to ensure a minimum spacing of the detached skin with respect to said layer and to give easy access to the gases into the separation zone.

Advantageously, the teeth are molded in one piece with the detached skin and/or the heat-protection layer of the bottom structure.

The invention will be more readily understood on reading the following description with reference to the accompanying drawings, in which :

FIG. 1 is a general view of a rocket motor with an internal anti-popping assembly according to the invention, FIG. 2 is a detailed view of part of the bottom of the rocket motor, according to FIG. 1, FIG. 3 is a partial view showing the disposition of the teeth on the detached skin according to FIG. 2;

Figure 4A:
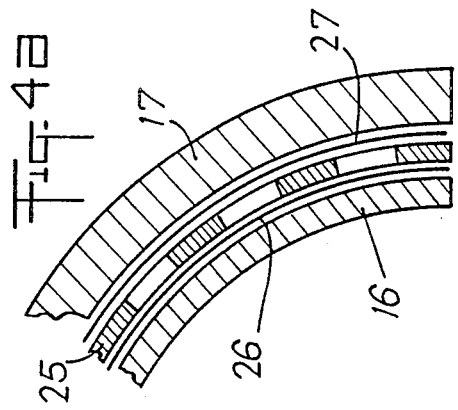
FIGS. 4a to 4c illustrate steps in a process for the production of the detached skin with teeth according to FIG. 2, and FIGS. 5a–5b, 6a–6b and 7 illustrate other processes for the production of the teeth for a rocket motor structure according to the invention.

Referring first to FIG. 1, this diagrammatically shows a solid propellant rocket comprising a casing 10 and a solid grain block 11 housed in said casing with interposition of a heat protection layer 12. A central channel forming combustion chamber 13 is provided in the solid grain. At the ends of the rocket motor, separation zones 15, 20 are formed by skins 16, 21 which are detached from the heat-protection layers 17,22 of the rocket bottom structure. As can be seen in FIG. 1, layers 17, 22 are thicker than the heat-protection layers in the center of the rocket motor, especially on the rear side where nozzle 14 is situated. Indeed, during the consumption of the grain, the bottom zones are those which are first in contact with the combustion gases.

According to the invention, projections or teeth are formed in the separation zones 15, 20 to prevent the closure thereof and to create a passage for gases from the combustion chamber towards the separation zones after ignition.

As illustrated in FIG. 1 and in more details in FIGS. 2 and 3, teeth 18 are, in the illustrated embodiment, formed in one piece with the detached skin 16, according to a staggered configuration. But obviously, said teeth can also be formed on the heatprotection layer of the bottom structure, such as teeth 23 in FIG. 1.

Figure 4B:
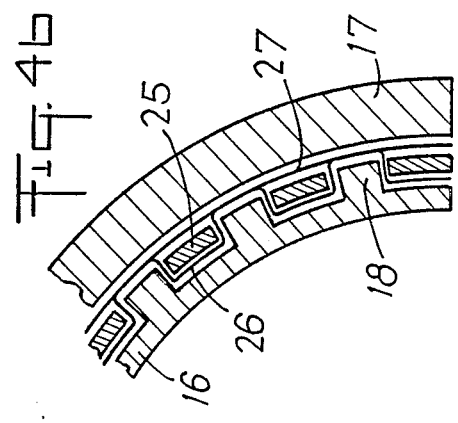
Figure 4C:
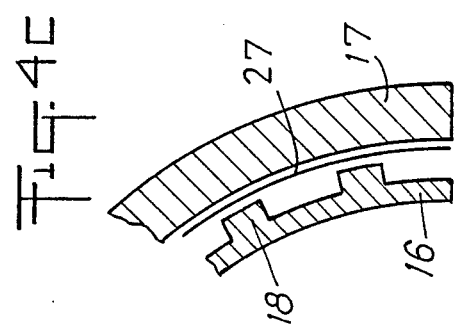

FIGS. 4a to 4c illustrate one process for manufacturing the detached skin 16 with teeth 18 illustrated in FIG. 2. The detached skin 16 made from uncured rubber, is draped on the pre-cured heat-protection layer 17, with interposition of a teeth mask 25 (FIG. 4a). Said mask is constituted of a perforated sheet in cured rubber of thickness equal to that of the teeth to be formed, and in which the perforations are situated in the spaces required for the teeth. Sheet 25 may be produced by draping, followed by curing, using as a mold the heat-protection layer 17; then it is perforated. Sheets 26, 27 in polytetrafluoroethylene (PTFE) are placed on each side of the teeth mask 25 in order to prevent the detached skin from sticking to the mask or, through said mask, to the heat-protection layer 17. The resulting assembly is then subjected to a curing treatment. Under the effect of the pressure, the rubber creeps through the holes in the mask 25 deforming the film 26 of PTFE. After curing (FIG. 4b), the inner face of the detached skin 16 shows a smooth and continuous profile, whereas the outer face has teeth 18 in the spaces where the perforations of the mask 25 are situated. Said mask is then removed and only one 27 is left in place to prevent the teeth 18 from sticking to the heat-protection layer 17 (FIG. 4c).

Figure 5A:
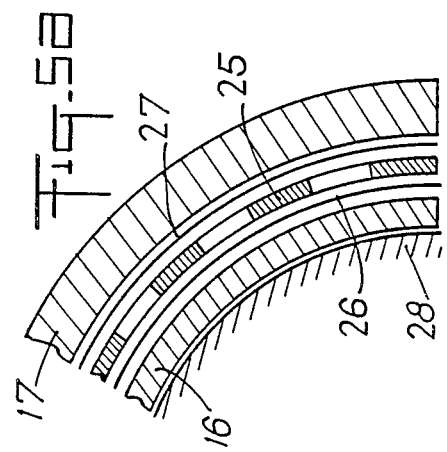
Figure 5B:
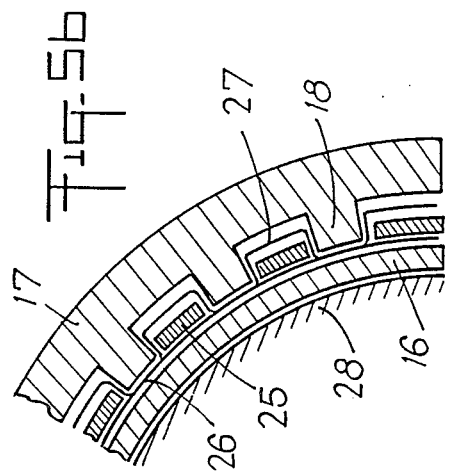

As a variant, teeth 18 may be formed on the heat-protection layer as illustrated in FIGS. 5a and 5b. The detached skin 16 is first produced on a male mold 28. The uncured heat-protection layer 17 is then draped over said mold already equipped with the cured detached skin 16 with interposition of the teeth mask 25 and of the PTFE sheets 26, 27 on each side of the mask (FIG. 5a). The heat-protection layer is cured, which causes a creeping of the rubber through the holes of the mask 25 with deformation of the sheet 27 (FIG. 5b). After the curing treatment, the teeth mask 25 is removed as well as one of the sheets 26, 27, leaving the heat-protection layer provided with teeth 18 in those parts occupied by the perforations of the mask 25.

Figure 6A:
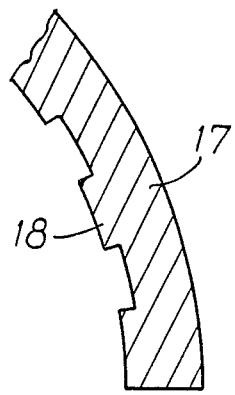
Figure 6B:
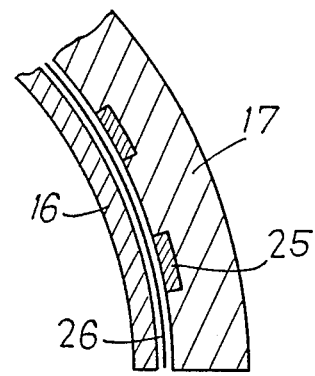

According to another variant, heat-protection layer 17 is formed directly with the teeth 18 in a mold of corresponding profile(FIG. 6a). Then, the detached skin 16 is draped over the heat-protection layer 17, after the positioning of a teeth mask 25, in order to fill the spaces between the teeth 18 and to prevent said teeth from sinking into the detached skin, and after interposition of a sheet 26 of PTFE, to prevent the skin 16 from sticking to the teeth 18 (FIG. 6b). The detached skin is then cured and the mask is removed. Understandably, it would also be possible to form the detached skin directly with the teeth in a mold of corresponding profile, then to drape the heat-protection layer after interposition of the teeth mask and of a sheet of PTFE, and to cure said layer.

Figure 7:
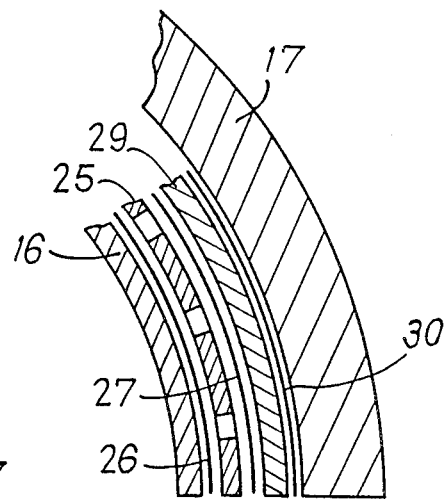

According to yet another variant (FIG. 7), the assembly composed of the detached skin and the heat-protection layer can be formed in one operation. The heat-protection layer 17 is draped and is covered over with a sheet of PTFE 30, with a cured protection skin 29, optionally with a sheet of PTFE 27, with the teeth mask 25, and with a second sheet of PTFE 26 on which is draped the detached skin 16. The heat-protection layer and the detached skin are cured. the rubber of the detached skin creeps into the holes of the mask in order to form teeth whereas creeping of the rubber of the heat-protection layer is prevented by the protection skin 29. Understandably, the teeth could just be formed on the heat-protection layer by reversing the positions of the mask 25 and of the protection skin 29.

What is claimed is:

1. An internal anti-popping arrangement for a solid propellant rocket motor comprising a propellant grain block housed in a casing and heat-protection means including a heat protection layer interposed between the propellant grain and the casing, the propellant grain defining a combustion chamber, said anti-popping arrangement comprising:

a separation zone formed in at least one end portion of the rocket motor between the propellant grain and the heatprotection layer by means of a skin detached from said heat-protection layer and adhering to the propellant grain block, said separation zone being of variable volume to accommodate dimensional variations of said propellant grain block within said casing, said separation zone being in gas flow communication with said combustion chamber; and projections or teeth formed in one piece with at least one of said detached skin and said heat-protection layer and projecting into said separation zone to ensure a minimum spacing of said detached skin with respect to said heat-protection layer and provide a permanent passage allowing easy access of gases from the combustion chamber to the separation zone.

* * * * *